May 6, 1969 J. H. WORTHEN 3,442,020
CENTERING MEANS FOR A BORE GAGE
Filed Feb. 23, 1967
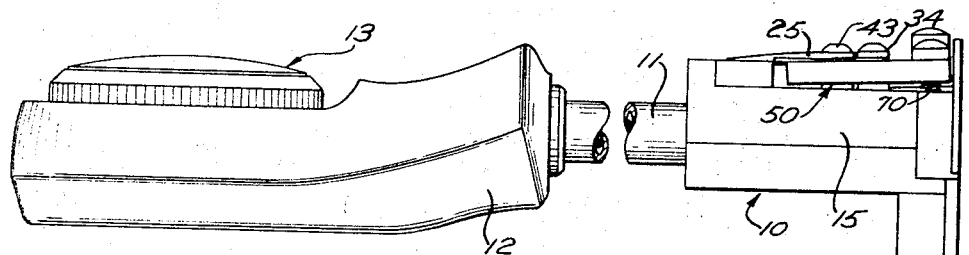
FIG. 1
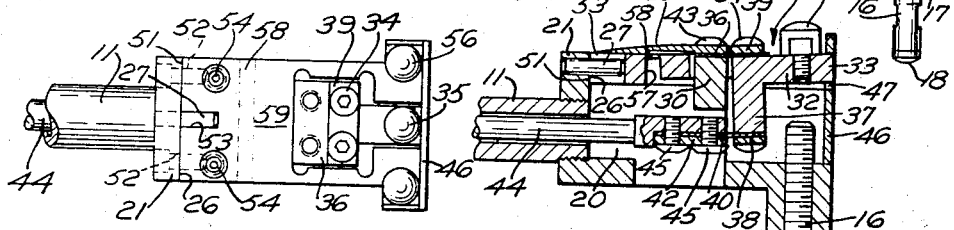
FIG. 2  FIG. 3
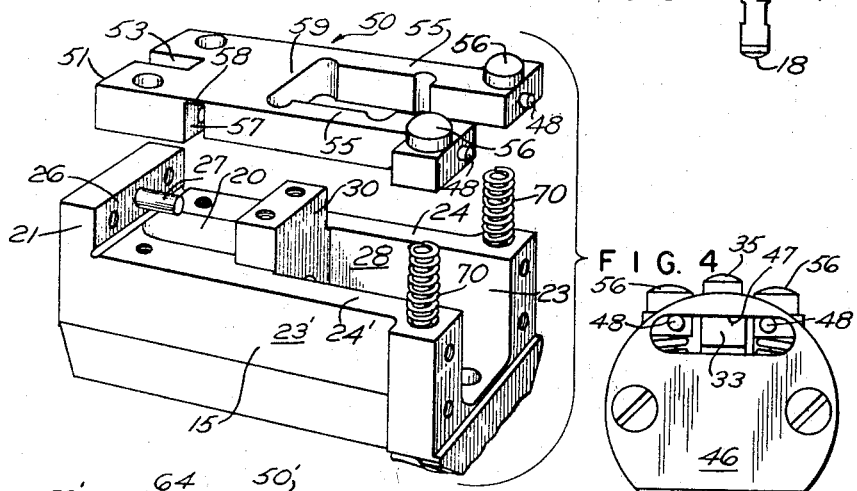
FIG. 4
FIG. 5
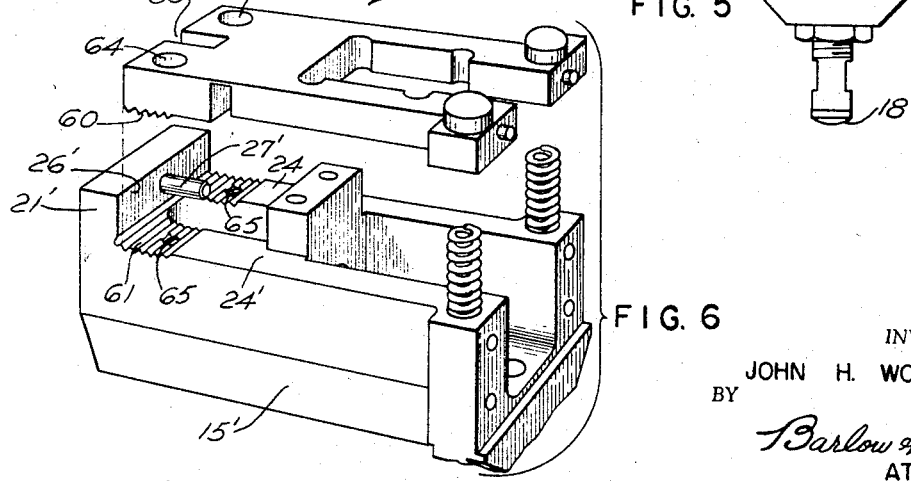
FIG. 6
INVENTOR.
JOHN H. WORTHEN
BY
Barlow & Barlow
ATTORNEYS 3,442,020
CENTERING MEANS FOR A BORE GAGE
John H. Worthen, Providence, R.I., assignor to Federal Products Corporation, a corporation of Rhode Island
Filed Feb. 23, 1967, Ser. No. 618,027
Int. Cl. G01b 5/12
U.S. Cl. 33—178                           2 Claims

ABSTRACT OF THE DISCLOSURE

A bore gage having a dial indicator and a work contacting head with means to transmit motion to the indicator for determining the size of the bore into which the head is inserted with a novel centering means to properly locate the head in the bore.

Background of the invention

The locating and measuring system of a gage usually has a bearing or bearings that create wear problems and dirt problems by reason of sliding parts which provide a constant maintenance problem and often require disassembly of the parts of the gage in order to clean the same. This is particularly so in a bore gage that is often used in a coolant environment that contains chips and the coolant proper which dries to a wax-like substance.

Summary

Centering contacts are mounted in the gage head by leaf spring reeds which may flex without friction to centralize and locate the head in the bore which it is to measure. The contacts are so firmly mounted that they cannot shift sidewise if the plate carrying the contacts is hit on its side or laid on its edge so as to disturb the alignment of the contacts with the contacts of the head.

Brief description of the drawings

FIG. 1 is an elevation of the gage with its indicator and gaging head;

FIG. 2 is a top plan view of the gaging head with the cover plate removed;

FIG. 3 is a section of the structure in FIG. 2;

FIG. 4 is an exploded view illustrating the gaging head body and the block which carries the centering contacts;

FIG. 5 is an end view taken from the right end of FIGS. 1-3; and

FIG. 6 is a perspective view of an alternate construction of the centering contacts.

Description of the preferred embodiment

A gage head 10 comprises a rigid body which has been hollowed out to receive operating parts therein. An adjustable but fixed measuring contact 16 is threaded into the body and held in fixed position by check nut 17 providing a contact point 18 generally central widthwise of the body and which may extend laterally from the body to any desired extent.

The body block 15 is cut away to provide a rear hollow chamber 20 and a forward hollow chamber 28 divided by a solid post portion 30 integral with the side walls 23 and 23' which extend lengthwise of the body and on either side of the solid post 30. These walls have upper surfaces 24 and 24' in a single plane extending substantially the length of the body. A bracket 21, integral with the block 15, rises from the plane of the surfaces 24, 24' and has an accurately machined front surface 26 formed at right angles to the surface 24. A pin 27 extends from this surface 26 and may be positioned at a suitable location laterally of the head, here illustrated as substantially central.

A coupling linkage 31 is generally of bell crank shape as seen in FIG. 3 and has a horizontally extending arm 32 which removably mounts a work engaging boss 35. This linkage also has a downwardly extending leg 37. The coupling linkage 31 is mounted in the body 15 by means of a leaf spring reed 36 which is secured to the upper surface of the movable contact by suitable means such as a block 39 and screws 34 and by suitable means to the rigid post 30 such as a cover member 25 bound to the post by screws 43.

The lower end of the leg 37 of the linkage has a leaf spring reed 40 and is suitably secured to the lower surface of the movable contact leg 37 such as by a block 38 having screws passing therethrough and into the leg 37. The other portion of the reed extending from the leg 37 is suitably secured such as by means of a block 42 and screws 45 to the motion transmitting rod 44 of the gage. This rod 44 extends through the handle 11 and serves to transmit motion to the dial indicator 13. The rod 44 extends lengthwise of the body through an opening in the end of the body, this bore continuing through the post 30 to substantially the chamber 28 of the body so as to provide freedom of movement of the rod 44 endwise in the body.

Centralizing of the head 10 is obtained by means of a plate-like member 50 (FIG. 4) having a base with an end surface 51 accurately machined to abut the machined surface 26 of the body and be secured thereto by screws 52 extending generally parallel to the pin 27 into the ends of the plate 50 drawing it securely against the surface 26, lateral centralization of the base being secured by means of the pin 27 closely fitting in the slot 53 located centrally of the plate 50. Screws 54 extend through the base into body surface 24, 24' to draw the bottom surface of plate 50 thereagainst. Thus a positive anchor of the base of the plate to bracket 21 and the body proper is provided. This bidirectional anchor resists any external forces that might inadvertently be applied to the plate and further affords in conjunction with the locating pin 27 positive repositioning of the plate upon disassembly for repairs. The plate 50 is cut away from its midportion to the end opposite the anchor end so as to provide legs 55 which carry the rounded work engaging contacts 56 protruding as bosses therefrom and for contact with the surfaces of the bore into which the gage body is positioned. The contact surfaces of these bosses are generally spherical and are located on either side of, at right angles to and equi-distant from a plane passing through the two measuring contacts 18 and 35. A slot 57 is cut through the plate 50 leaving a thin flexible leaf-like spring hinge portion 58 which enables the legs 55, rigidly connected by a bridge portion 59, to flex about this hinge portion 58. Thus the desired lateral rigidity is provided by means of this plate 50, while also permitting flexibility of the work contact points 56 with relation to the body of the gage. Further, the plate 50 is positively located at all times, as mentioned above, and cannot be jarred out of position. Thus a true three point positioning is achieved.

At the end of the body there is a plate 46 having an opening 47 therein into which the end 33 of the arm 32 of the linkage extends as well as the teats 48 of the centralizer plate 50. Thus the upper and lower edges of this opening 47 serve as a means to prevent excessive movement of the bell crank shaped linkage and the centralizer plate on its leaf spring reed mountings although movement of the member is permitted.

The cover 25, one end of which serves to provide a jaw for binding the reed 36 to the rigid post 30 may be provided to extend over the plate 50 and over the spring hinge portion 58 to the bracket 21 to serve as a protection to this plate 50. The legs 55 of this plate 50 straddle the rigid post 30 and are spaced therefrom sufficiently so that these legs or the portion on one side of the spring hinge 58 has freedom of movement. Springs 70 located beneath each of the legs urges the legs upwardly flexing the spring hinge 58.

In FIGURE 6 there is shown an alternate form of centering plate and body structure. In this embodiment the locating of the plate 50' is achieved by the use of V's and mating notches together with the locating pin 27' and the slot 53'. Thus the bracket 21' serves only to support pin 27' as clearance is provided between its surface 26' and the end wall of plate 50'. As will be appreciated, one or a plurality of V-shaped protrusions 60 are machined on the undersurface of plate 50' and a mating V-shaped notch or notches 61 are machined into the surface 24, 24' of the body 15'. As in the first described embodiment screws passing through holes 64 and into threaded holes 65 bind the V and notch together into positive position.

It will therefore be seen that there is provided movable centralizing contacts which are accurately positionable on a repeatable basis by virtue of locking surfaces and means which cooperate with portions of the bore gage body.

I claim:
1. In a gage, a gage head having a body with a machined upper surface, means for centralizing said head in a bore comprising legs with work contacts thereon and a base contacting said surface, leaf spring means coupling said legs and base, said surface and base having interfitting mating V shape surfaces laterally of said legs and means to draw said mating surfaces together to align said body and base.

2. In a gage as in claim 1 wherein said base has a slot substantially perpendicular to said V-shaped surfaces and a pin fixed on said body extends into said slot and engages the walls thereof to laterally align said body and base.

References Cited
UNITED STATES PATENTS

| | | |
|---|---|---|
| 2,720,033 | 10/1955 | Eisele. |
| 2,802,276 | 8/1957 | Straw. |
| 1,057,954 | 4/1913 | Foulon. |
| 2,163,920 | 6/1939 | Standlee. |

SAMUEL S. MATTHEWS, *Primary Examiner.*